(12) United States Patent
Kim et al.

(10) Patent No.: US 11,882,481 B2
(45) Date of Patent: Jan. 23, 2024

(54) APPARATUS AND METHOD FOR PROVIDING OFFLOADING SERVICE

(71) Applicant: Electronics and Telecommunications Research Institute, Daejeon (KR)

(72) Inventors: Soon Choul Kim, Daejeon (KR); Sung Ik Park, Daejeon (KR); Jae-young Lee, Daejeon (KR); Hyun-Jeong Yim, Sejong-si (KR); Namho Hur, Sejong-si (KR); Dong Joon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/718,938

(22) Filed: Apr. 12, 2022

(65) Prior Publication Data

US 2022/0330095 A1 Oct. 13, 2022

(30) Foreign Application Priority Data

Apr. 13, 2021 (KR) .......................... 10-2021-0047872

(51) Int. Cl.
*H04W 28/08* (2023.01)
*H04N 21/438* (2011.01)
(Continued)

(52) U.S. Cl.
CPC ...... *H04W 28/0967* (2020.05); *H04N 21/438* (2013.01); *H04N 21/6131* (2013.01); *H04W 84/042* (2013.01)

(58) Field of Classification Search
CPC .......... H04W 28/0967; H04W 84/042; H04N 21/438; H04N 21/6131
(Continued)

(56) References Cited

U.S. PATENT DOCUMENTS 10,904,791 B2  1/2021  Naik et al.
2014/0313973 A1  10/2014  Park et al.
(Continued)

FOREIGN PATENT DOCUMENTS

KR  102015-0143424  12/2015
KR  10-2016-0035049  3/2016
(Continued)

OTHER PUBLICATIONS

Michael Simon at al., "ATSC 3.0 Broadcast 5G Unicast Heterogeneous Network Converged Services Starting Release 16", IEEE Transactions on Broadcasting, Jun. 2020, pp. 449-458, vol. 66, No. 2.
(Continued)

*Primary Examiner* — Obaidul Huq
(74) *Attorney, Agent, or Firm* — KILE PARK REED & HOUTTEMAN PLLC

(57) ABSTRACT

Disclosed are an apparatus and method for providing an offloading service. A method of providing an offloading service according to an example embodiment includes streaming, to a user terminal including a cellular network receiver and a broadcast network receiver, media content data through a cellular network, transmitting, to the user terminal, an offloading service providing signal for activating the broadcast network receiver of the user terminal through the cellular network, transmitting, to the user terminal, a broadcast signal including connection information of a broadcast network to which the user terminal is to be connected so as to receive the media content data, through the cellular network, and broadcasting the media content data through the broadcast network.

16 Claims, 6 Drawing Sheets

(51) Int. Cl.
*H04N 21/61* (2011.01)
*H04W 84/04* (2009.01)

(58) Field of Classification Search
USPC .......................................... 370/310, 328, 329
See application file for complete search history.

(56) References Cited

U.S. PATENT DOCUMENTS

| | | | | |
|---|---|---|---|---|
| 2015/0296402 | A1* | 10/2015 | Saghir | H04W 48/06 370/230 |
| 2020/0178121 | A1* | 6/2020 | Simon | H04W 28/065 |
| 2021/0136460 | A1* | 5/2021 | Farrell | H04N 21/6137 |

FOREIGN PATENT DOCUMENTS

| | | |
|---|---|---|
| KR | 10-2017-0099238 | 8/2017 |
| KR | 10-2020-0038870 | 4/2020 |
| KR | 10-2020-0125656 | 11/2020 |

OTHER PUBLICATIONS

Overview of 3GPP Release 9 V0.3.4 (Sep. 2014).
Overview of 3GPP Release 10 V0.2.1 (Jun. 2014).
Overview of 3GPP Release 12 V0.2.0 (Sep. 2015).
3GPP TR 21.916 V16.1.0 (Jan. 2022); 3rd Generation Partnership Project; Technical Specification Group Services and System Aspects; Release 16 Description; Summary of Rel-16 Work Items (Release 16).

* cited by examiner

APPARATUS AND METHOD FOR PROVIDING OFFLOADING SERVICE

CROSS-REFERENCE TO RELATED APPLICATION

This application claims the benefit of Korean Patent Application No. 10-2021-0047872 filed on Apr. 13, 2021, in the Korean Intellectual Property Office, the entire disclosure of which is incorporated herein by reference for all purposes.

BACKGROUND

1. Field

One or more example embodiments relate to a technology for providing an offloading service.

2. Description of the Related Art

Mobile data-offloading, which is a technology for distributing traffic to a wireless LAN that is relatively cost-effective when mobile traffic is concentrated in a narrow place such as a concert hall or an airport, is a solution to reduce limitations associated with a bandwidth and a data capacity. In 3GPP, a traffic distribution technology in a wireless section, a core network, and a heterogeneous network (wireless LAN) has been applied through the offloading standards of a local IP access (LIPA) of the 3GPP release 9 standard, and a selected IP traffic offload (SIPTO) and IP flow mobility (IFOM) of the 3GPP release 10 standard. In multicast operation on demand (MooD) of the 3GPP release 12 standard, service continuity is ensured through dynamic switching between unicast and broadcast. The recent 3GPP release 16 standard has made it possible to combine with various networks other than 5G through an access traffic steering, switching and splitting (ATSSS) standard technology, and the standard has been achieved by unifying an equipment-to-equipment interface for data continuity.

SUMMARY

According to an aspect, there is provided a method of providing an offloading service for offloading media content data streamed through a cellular network to a broadcast network, the method including streaming, to a user terminal including a cellular network receiver and a broadcast network receiver, the media content data through the cellular network, transmitting, to the user terminal, an offloading service providing signal for activating the broadcast network receiver of the user terminal through the cellular network, transmitting, to the user terminal, a broadcast signal including connection information of the broadcast network to which the user terminal is to be connected so as to receive the media content data, through the cellular network, and broadcasting the media content data through the broadcast network.

The method may further include determining whether to provide the offloading service. The transmitting of the offloading service providing signal may be performed when it is determined to provide the offloading service.

The determining of whether to provide the offloading service may include determining a service quality of the cellular network in an area in which the user terminal is located, determining the number of user terminals including the broadcast network receiver, and determining to provide the offloading service when the service quality and the number of user terminals satisfy a predetermined offloading rule.

The cellular network may be a 5G network, and the broadcast network may be an advanced television systems committee (ATSC) 3.0 network.

The determining of whether to provide the offloading service may further include determining whether the ATSC 3.0 network is available in the area, and the determining to provide the offloading service may include determining to provide the offloading service when the service quality, the number of user terminals, and whether the ATSC 3.0 network is available satisfy the offloading rule.

The determining of the service quality may include determining, based on a load factor of the cellular network, reception performance of the user terminal, and a load factor of a server that provides the media content data, the service quality.

According to another aspect, there is provided an apparatus for providing an offloading service, the apparatus including a media streaming module configured to stream, to a user terminal including a cellular network receiver and a broadcast network receiver, media content data through a cellular network, a media stream packaging module configured to broadcast the media content data through a broadcast network, and a control module configured to provide, to a user terminal, an offloading service providing signal for activating the broadcast network receiver of the user terminal through the cellular network, transmit, to the user terminal, a broadcast signal including connection information of the broadcast network to which the user terminal is to be connected so as to receive the media content data, through the cellular network, and instruct the media stream packaging module so as to broadcast the media content data through the broadcast network.

The control module may include a rule determiner configured to determine whether to provide the offloading service, a broadcast signal generator configured to transmit, to the user terminal, the offloading service providing signal and the broadcast signal, and instruct the media stream packaging module so as to broadcast the media content data through the broadcast network, a collector configured to collect information on a media server, the cellular network, and the user terminal, and a service reporting receiver configured to report, to the collector, usage environment information of the user terminal.

The broadcast signal generator may be configured to transmit the offloading service providing signal and the broadcast signal when the rule determiner determines to provide the offloading service.

The control module may be configured to receive a predetermined offloading policy, and determine, based on whether an offloading rule included in the offloading policy is satisfied, whether to provide the offloading service.

The offloading policy may include connection information of a broadcast network to be used for an offloading service, the offloading rule, and an offloading condition. The offloading condition may include at least one of items including whether the broadcast network is available in a reception area in which the media content data is received, a service quality of the cellular network, and the number of user terminals including a receiver capable of receiving the broadcast network.

The offloading rule may include items to be considered and items not to be considered in determining whether to provide the offloading service from among the items included in the offloading condition, and a ratio considered between the items to be considered.

The cellular network may be a 5G network, and the broadcast network may be an ATSC 3.0 network.

According to still another aspect, there is provided a user terminal including a cellular network receiver configured to receive media content data in a unicast or multicast manner through a cellular network, a broadcast network receiver configured to receive the media content data broadcasted through a broadcast network, and at least one processor. The at least one processor may be configured to perform an operation of receiving the media content data using the cellular network receiver, an operation of receiving an offloading service providing signal using the cellular network receiver, and an operation of activating the broadcast network receiver that is in an idle state in response to the received offloading service providing signal.

The at least one processor may be further configured to perform an operation of receiving a broadcast signal including connection information of the broadcast network to be connected so as to receive the media content data using the cellular network receiver, and an operation of receiving the media content data through the broadcast network receiver using the connection information included in the received broadcast signal.

The at least one processor may be further configured to perform an operation of receiving an offloading service termination signal indicating that the offloading service is terminated using the broadcast network receiver, and an operation of switching the broadcast network receiver to the idle state.

Additional aspects of example embodiments will be set forth in part in the description which follows and, in part, will be apparent from the description, or may be learned by practice of the disclosure.

According to example embodiments, a system and method for providing an offloading service may allow a 5G network operator to provide a standard-based stable broadcast media service using an ATSC 3.0 broadcast network.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
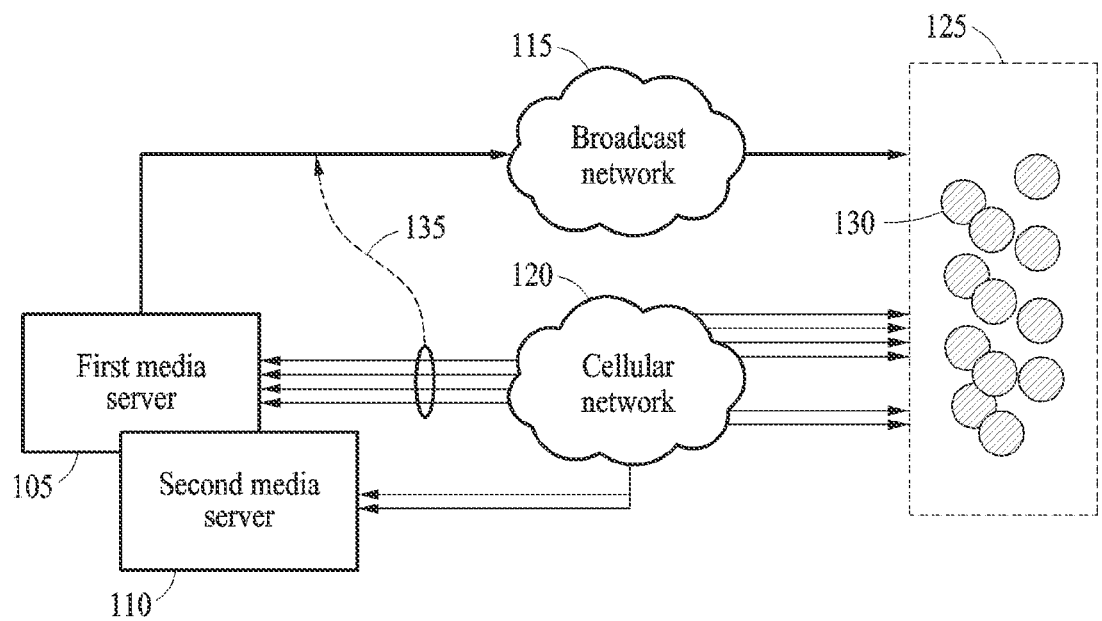
FIG. 1 is a diagram schematically illustrating a system and method for providing an offloading service according to an example embodiment.

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Although terms such as "first," "second," and "third" may be used herein to describe various members, components, regions, layers, or sections, these members, components, regions, layers, or sections are not to be limited by these terms These terms are used only to distinguish one component from another component. For example, a first component may be referred to as a second component, or similarly, the second component may be referred to as the first component within the scope of the present disclosure.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

FIG. 1 is a diagram schematically illustrating a system and method for providing an offloading service according to an example embodiment.

FIG. 1 illustrates an offloading service providing system capable of switching a media streaming service through a cellular network 120 to a broadcast network 115, and providing the media streaming service.

In a process of providing a media content streaming service through the cellular network 120 to user terminals 130 equipped with a receiver of the cellular network 120 and a receiver of the broadcast network 115 within a specific area 125 in a unicast or multicast manner, excessive connection to specific media content (for example, a YouTube channel, or real-time broadcasting of sports stadiums) may deteriorate a network quality of the receiver-dense area 125, or may degrade performance of a server. In this case, the corresponding media content may be offloaded 135 to the broadcast network 115 for service stability. When the broadcast network 115 is supported in the corresponding reception area 125, and there are more than a predetermined number of user terminals 130 capable of receiving media content through the broadcast network 115, the corresponding media content may be induced to receive the media streaming service through the broadcast network 115 by switching a connection path to a channel of the broadcast network 115.

In FIG. 1, the user terminals 130 including the receiver of the cellular network 120 and the receiver of the broadcast network 115 in the reception area 125 may receive the media content streaming service through the cellular network 120. In an example embodiment, the receiver of the cellular network 120 may be a 5G network receiver, and the receiver of the broadcast network 115 may be an ATSC 3.0 receiver. A first media server 105 may stream, to the user terminals 130 in the reception area 125, first media content data in a unicast or multicast manner through the cellular network 120, and a second media server 110 may stream, to the user terminals 130 in the reception area 125, second media content data in a unicast or multicast manner through the cellular network 120.

In the process of providing the media content streaming service through the cellular network 120, excessive connection to the first media content of the first media server 105 may deteriorate the network quality of the receiver-dense area 125, or may degrade performance of the first media server 105.

The first media server 105 may determine, for service stabilization, whether to provide an offloading service from the cellular network 120 to the broadcast network 115 in consideration of at least one of whether the broadcast network 115 is available in the corresponding reception area 125, a service quality of the cellular network 120, and the number of user terminals 130 including a receiver capable of receiving the broadcast network 115.

When the first media server 105 determines to provide the offloading service, the first media server 105 may transmit, to the user terminal 130, an offloading service providing signal 130 through the cellular network 120 so that the user terminal 130 prepares for reception of media content data through the broadcast network 115. When the user terminal 130 receives the offloading service providing signal, the receiver of the broadcast network 115 may be activated.

After the offloading service providing signal is transmitted, the first media server 105 may transmit, to the user terminal 130, a broadcast signal including connection information of the broadcast network 115 to which the user terminal 130 is to be connected so as to receive the media content data, through the cellular network 120. In an example embodiment, the connection information may include a broadcast channel of the broadcast network 115 to which the user terminal 130 is to be connected so as to receive the media content data. In an example embodiment, a channel of a broadcast network to be used for offloading may be determined by an offloading policy. The offloading policy is described below with reference to FIG. 7. The user terminal 130 may complete preparation for receiving the media content data through a broadcast network receiver by receiving a broadcast signal.

After the broadcast signal is transmitted, the first media server 105 may broadcast the media content data through the broadcast network 115. The media content data may be transmitted to a broadcast channel determined by the offloading policy, and the user terminal 130 may be connected to the broadcast channel to receive the media content data.

When the first media server 105 intends to terminate the offloading service, the first media server 105 may transmit an offloading service termination signal to the user terminal 130 through the broadcast network 115. When the user terminal 130 receives the offloading service termination signal, the receiver of the broadcast network 115 may be deactivated.

According to an offloading service providing system according to an example embodiment, a cellular network operator (for example, a 5G network operator) may use a broadcast network (for example, an ATSC 3.0 broadcast network) to provide a standard-based stable media content streaming service.

Figure 2:
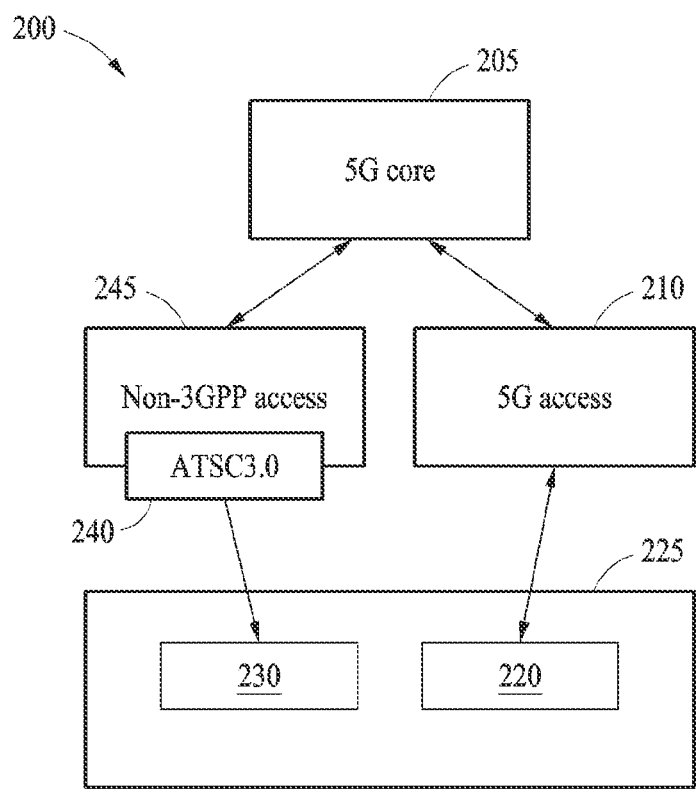
FIG. 2 is a diagram schematically illustrating an offloading service providing system according to an example embodiment.

FIG. 2 is a diagram schematically illustrating an offloading service providing system according to an example embodiment.

In an existing communication network, a user terminal 225 including an ATSC 3.0 broadcast network receiver 230 and a 5G cellular network receiver 220 may be connected to access of each of a broadcast network and a cellular network (for example, ATSC 3.0 access and 5G access) to receive an individual media service. According to the offloading service providing system 200 according to an example embodiment, the user terminal 225 may offload data transmitted from one 5G core 205 from the cellular network to the broadcast network to receive the data through the broadcast network.

Referring to FIG. 2, the offloading service providing system 200 according to an example embodiment may include a non-3GPP access structure 245 of the 3GPP standard that communicates with the 5G core 205 together with a 5G access structure 210. The offloading service providing system 200 may add a broadcasting gateway 240 of the ATSC 3.0 standard to the non-3GPP access structure 245 to offload a media streaming service of a 5G network to an ATSC 3.0 broadcast network.

In the offloading service providing system 200, the 5G access network 210 and the cellular network receiver 220 of the user terminal 225 may communicate with each other in a unicast or multicast manner, and the ATSC 3.0 access network 245 and the broadcast network receiver 230 of the user terminal 225 may communicate with each other in a broadcast manner.

Figure 3:
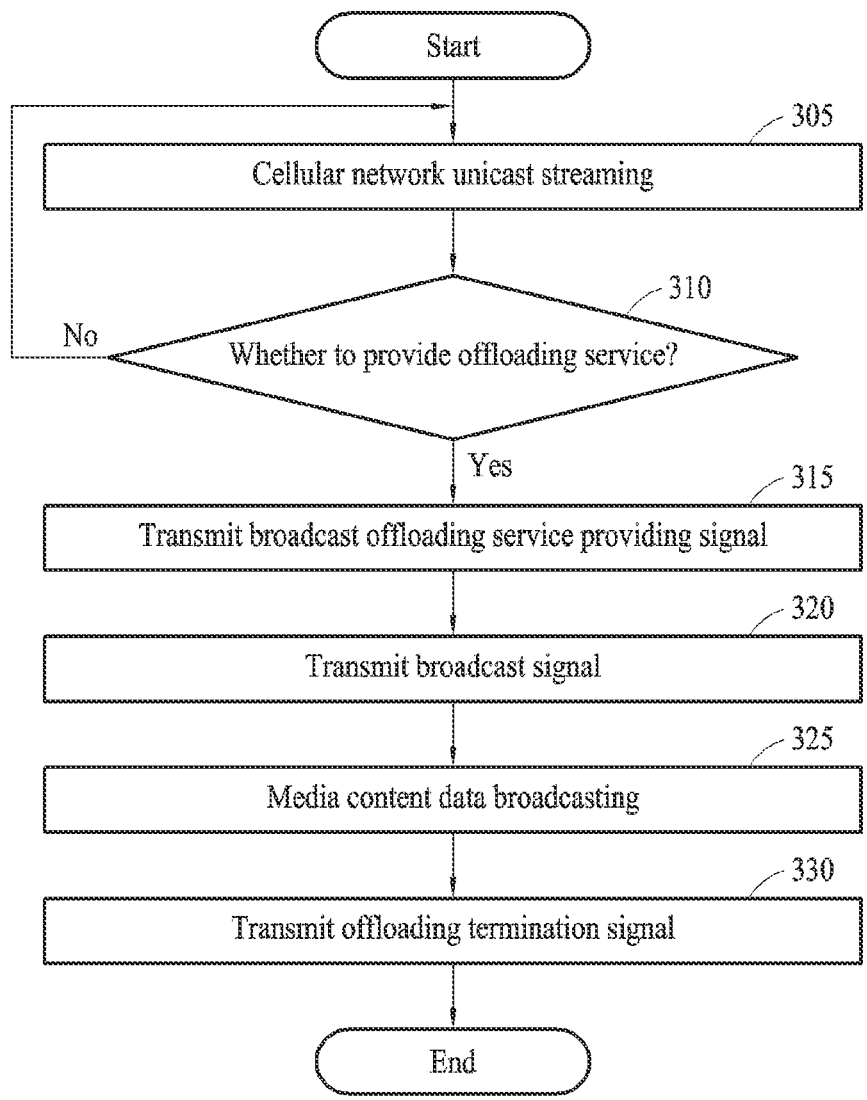
FIG. 3 is a flowchart illustrating an offloading service providing method according to an example embodiment.

FIG. 3 is a flowchart illustrating an offloading service providing method according to an example embodiment.

In operation 305, an offloading service providing system may stream, to a user terminal including a cellular network receiver and a broadcast network receiver, media content data in a unicast or multicast manner through a cellular network.

In a process of providing a streaming service through the cellular network, excessive connection to a media server that provides the media content data may deteriorate a network quality of an area in which the user terminal is located, or may degrade performance of the media server. In operation 310, the offloading service providing system may determine whether to provide an offloading service from a cellular network to a broadcast network in consideration of at least one of whether the broadcast network is available in a media content data reception area, a service quality of the cellular network, and the number of user terminals including a receiver capable of receiving the broadcast network. In an example embodiment, the cellular network may be a 5G network, and the broadcast network may be an ATSC 3.0 network.

When it is determined not to provide the offloading service in operation 310, the offloading service providing system may continuously perform streaming in a unicast or multicast manner through the cellular network.

In operation 315, the offloading service providing system may transmit an offloading service providing signal to the user terminal when it is determined to provide the offloading service for service stabilization in operation 310. The user terminal that receives the offloading service providing signal may activate the broadcast network receiver of the user terminal to prepare for receiving the streaming service through the broadcast network.

In operation 320, the offloading service providing system may transmit, to the user terminal, a broadcast signal including connection information of the broadcast network to which the user terminal 130 is to be connected so as to receive the media content data, through the cellular network. In an example embodiment, the connection information may include a broadcast channel of the broadcast network to which the user terminal is to be connected so as to receive the media content data. In an example embodiment, the connection information (for example, the broadcast channel) to be used for offloading may be determined by an offloading policy. The offloading policy is described below with reference to FIG. 7.

In operation 325, the offloading service providing system may provide, to the user terminal, streaming of the media content data in a broadcast manner through the broadcast network.

In operation 330, when the offloading service is to be terminated, an offloading service termination signal may be transmitted to the user terminal through the broadcast network. When the offloading service termination signal is received, the user terminal may deactivate the broadcast network receiver.

Figure 4:
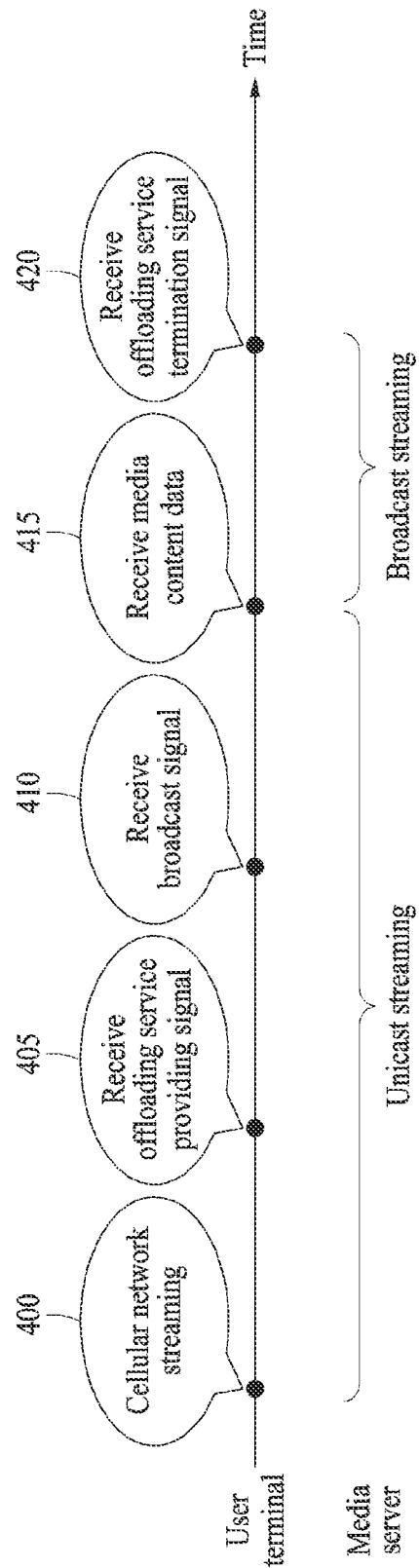
FIG. 4 is a diagram illustrating an operation performed by a user terminal that receives an offloading service according to an example embodiment.

FIG. 4 is a diagram illustrating an operation performed by a user terminal that receives an offloading service according to an example embodiment.

FIG. 4 illustrates, according to time, an operation performed by a user terminal in a process of providing an offloading service, and a cast manner provided from a media server.

In an example embodiment, the user terminal may include a cellular network receiver for receiving media content data in a unicast or multicast manner through a cellular network, a broadcast network receiver for receiving media content data broadcasted through a broadcast network, and at least one processor.

In operation 400, the processor may receive media content data streamed from the media server using the cellular network receiver. The broadcast network receiver included in the user terminal may be in an idle state.

In operation 405, the processor may receive an offloading service providing signal from the media server using the cellular network receiver. When the offloading service providing signal is received, the processor may activate the broadcast network receiver that is in the idle state to prepare for network switching.

In operation 410, the processor may receive a broadcast signal including connection information of the broadcast network to be connected so as to receive the media content data using the cellular network receiver. The processor that receives the broadcast signal may receive the media content data using the connection information (for example, a channel) included in the broadcast signal.

The media server may stream the media content data in a unicast manner through the cellular network while operations 400 to 410 are performed by the user terminal.

In operation 415, the processor may receive the media content data transmitted using the broadcast network receiver. The processor may extract and decode media information from the received media content data. The processor may seamlessly perform decoding of the received media content data.

When the media server intends to terminate the offloading service, the media server may transmit the offloading service termination signal through the broadcast network. In operation 420, the processor may receive an offloading termination signal through the broadcast network receiver. When the offloading termination signal is received, the processor may switch the broadcast network receiver to the idle state.

In the offloading service providing system according to an example embodiment, a user of the user terminal may receive a stable broadcast media service.

Figure 5:
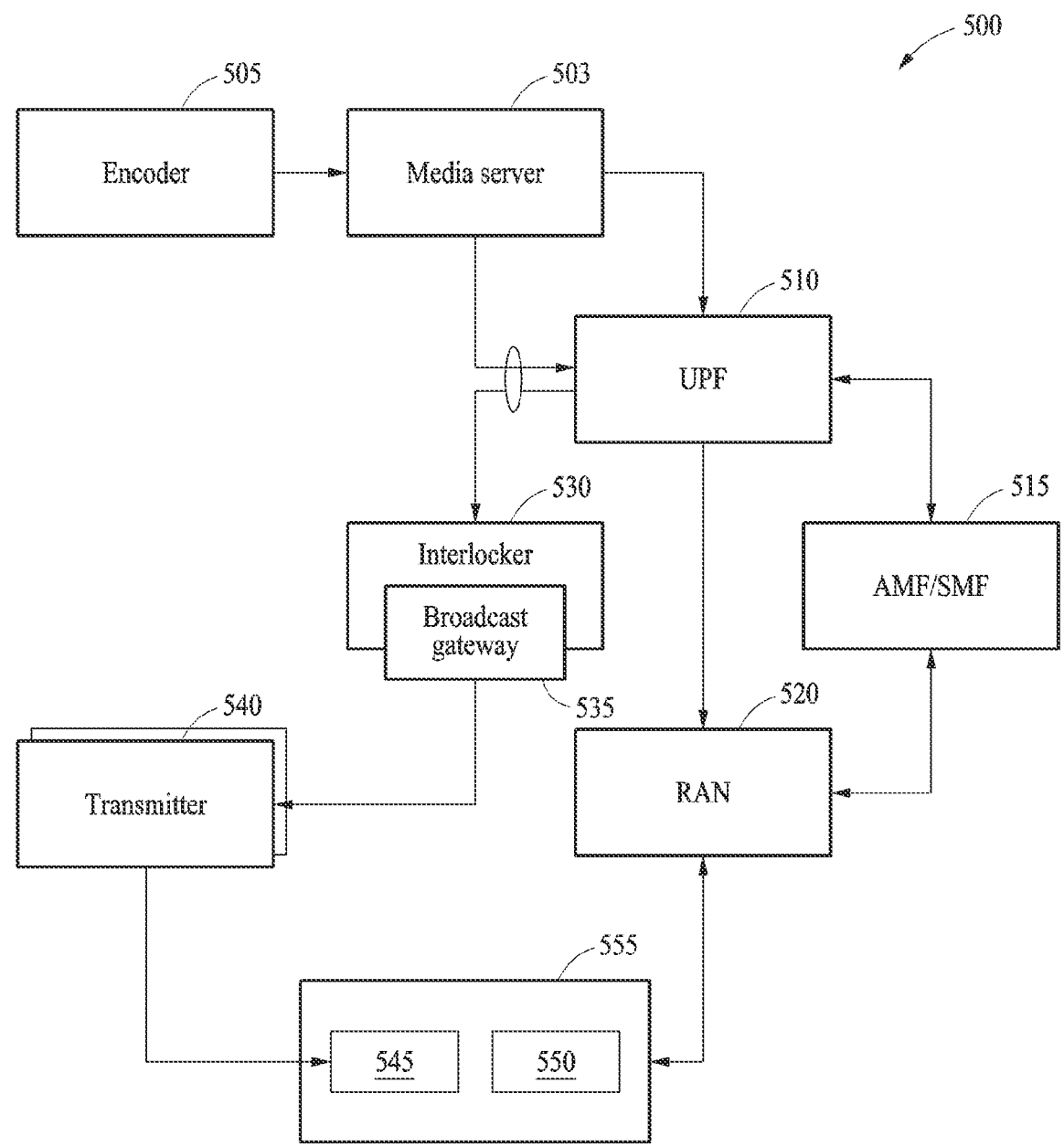
FIG. 5 is a diagram illustrating a configuration of an offloading service providing system according to an example embodiment.

FIG. 5 is a diagram illustrating a configuration of an offloading service providing system according to an example embodiment.

Referring to FIG. 5, the offloading service providing system 500 (for example, the offloading service providing system 200 in FIG. 2) may include a cellular network including an encoder 505, a media server 503 that streams media content data in a unicast or multicast manner through a radio access network (RAN) 520, a user plane function (UPF), a core access and mobility management function/session management function (AMF/SMF) 515, and the RAN 520 that transmits the media content data to a user terminal 555. In an example embodiment, the cellular network may be a 5G network. The offloading service providing system 500 may further include the user terminal 555 including an interlocker 530, a transmitter 540, and a 5G cellular network receiver 550 and ATSC 3.0 broadcast network receiver 545, so as to provide an offloading service.

The offloading service providing system 500 may further include the interlocker 530 including a broadcast gateway 535 and the transmitter 540 in addition to the 5G cellular network including the encoder 505, the UPF 510, the AMF/SMF 515, and the RAN 520.

The media server 503 may have an application server structure for controlling a media streaming service to the 5G cellular network and the ATSC 3.0 broadcast network. The media server 503 may include a media streaming module (not illustrated) that streams the media content data through the cellular network and a media stream packaging module (not illustrated) that broadcasts the media content data through the broadcast network. In an example embodiment, the media streaming module (not illustrated) may be a dynamic adaptive streaming over HTTP (DASH)-based media streaming module that conforms to the 5G standard. In an example embodiment, the media stream packaging module (not illustrated) may be a media stream packaging (for example, a real time object delivery over unidirectional transport (ROUTE)) module that conforms to the ATSC 3.0 standard.

The encoder 505 may encode media content according to the DASH standard, and transmit a DASH segment to the media server 503. The media server 503 may perform streaming to the user terminal 555 in a unicast or multicast manner through the UPF 510 and the RAN 520 in a streaming process through the cellular network. The UPF 510, the AMF/SMF 515, and the RAN 520, which are 5G network components of the 3GPP standard, may be implemented as defined in the 3GPP standard. The media server 503 may perform streaming in a unicast or multicast manner through the cellular network. Thus, as the number of user terminals 555 that receive the media content data in a specific area increases, a load factor of the media server 503 may be increased, and performance of the media server 503 may be degraded.

The media server 503 may offload the media content data streamed in the 5G cellular network to the broadcast network through the interlocker 530 and the transmitter 540. In an example embodiment, the offloading service providing system 500 may include the interlocker 530 for offloading the media content data to another network. The interlocker 530 may be a non-3GPP interworking function (N3IWF) for non-3GPP access connection of the 3GPP standard.

The media server 503 may generate a common tunneling protocol (CTP) packet of the ATSC A/324 standard including the media content data, and then transmit packets to the interlocker 530 in an area to be offloaded, so as to provide the offloading service. The CTP packet generated by the media server 503 may be transmitted to the interlocker 530 in the form of an Internet protocol (IP)/user datagram protocol (UPD)/real-time transport protocol (RTP) packet.

The interlocker 530 may include the broadcast gateway 535 so as to offload the media content data to the broadcast network. The interlocker 530 may identify destination addresses and port numbers of the arriving packets, and forward the packets to the broadcast gateway 535. The broadcast gateway 535 may transmit the media content data to the transmitter 540. In an example embodiment, the transmitter 540 may include an exciter, and communication between the broadcast gateway 535 and the transmitter 540 may be performed according to the A/324 standard of ATSC 3.0.

The transmitter 540 may be implemented according to the A/321 and A/322 standards of ATSC 3.0, and may receive an output signal of the broadcast gateway 535 through a studio-to-transmitter link transport protocol (STLTP) to convert the output signal into an RF signal.

The offloading service providing system 500 according to an example embodiment may relieve loads of the media server 503 and the cellular network, and may efficiently broadcast the media content through the broadcast network.

Figure 6:
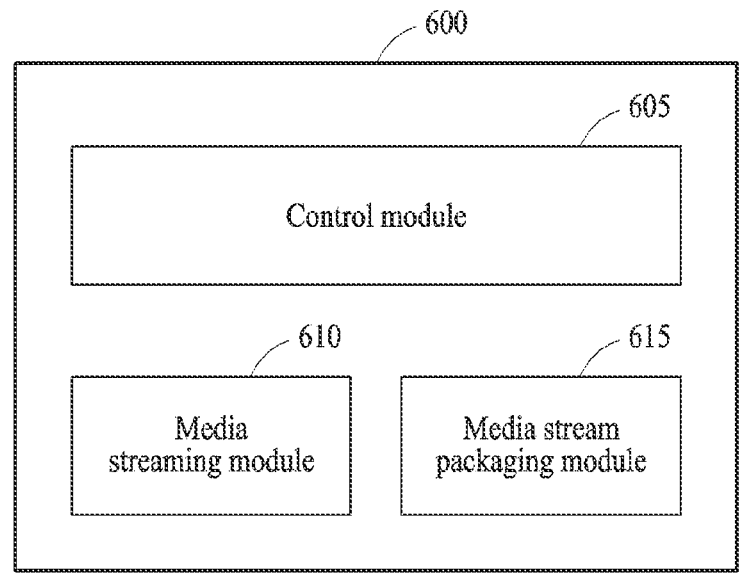
FIG. 6 is a block diagram illustrating a configuration of a media server according to an example embodiment.

FIG. 6 is a block diagram illustrating a configuration of a media server 600 according to an example embodiment.

Referring to FIG. 6, the media server 600 (for example, the media server 503 in FIG. 5) may include a media streaming module 610 that streams media content data through a cellular network, a media stream packaging module 615 that broadcasts the media content data through a broadcasting network, and a control module 605.

In an example embodiment, the media streaming module 610 may be a DASH-based media streaming module 610 that conforms to the 5G standard. In an example embodiment, the media stream packaging module 615 may be a media stream packaging (for example, ROUTE) module that conforms to the ATSC 3.0 standard.

The media streaming module 610 may receive the media content data from an encoder, and stream the received media content data in a unicast or multicast manner through the cellular network.

In a process where the media streaming module 610 provides a media content streaming service, excessive connection to media content may degrade performance of the media server 600. In an example embodiment, the control module 605 may determine, based on an offloading rule and an offloading condition included in an offloading policy, whether to provide an offloading service. An operation performed by the control module 605 is described in detail below with reference to FIG. 7.

The control module 605 may determine to provide the offloading service when the offloading rule is satisfied. The control module 605 may transmit an offloading service providing signal to a user terminal through the cellular network so that the user terminal prepares for reception of the media content data through the broadcast network.

After the offloading service providing signal is transmitted, the control module 605 may transmit, to the user terminal, a broadcast signal including connection information of the broadcast network to which the user terminal is to be connected so as to receive the media content data, through the cellular network.

The control module 605 may instruct the media stream packaging module 615 of the media server 600 so as to broadcast the media content data through the broadcast network.

The media stream packaging module 615 may transmit the media content data to an interlocker (for example, the interlocker 530 in FIG. 5) so as to broadcast the media content data through the broadcast network.

Figure 7:
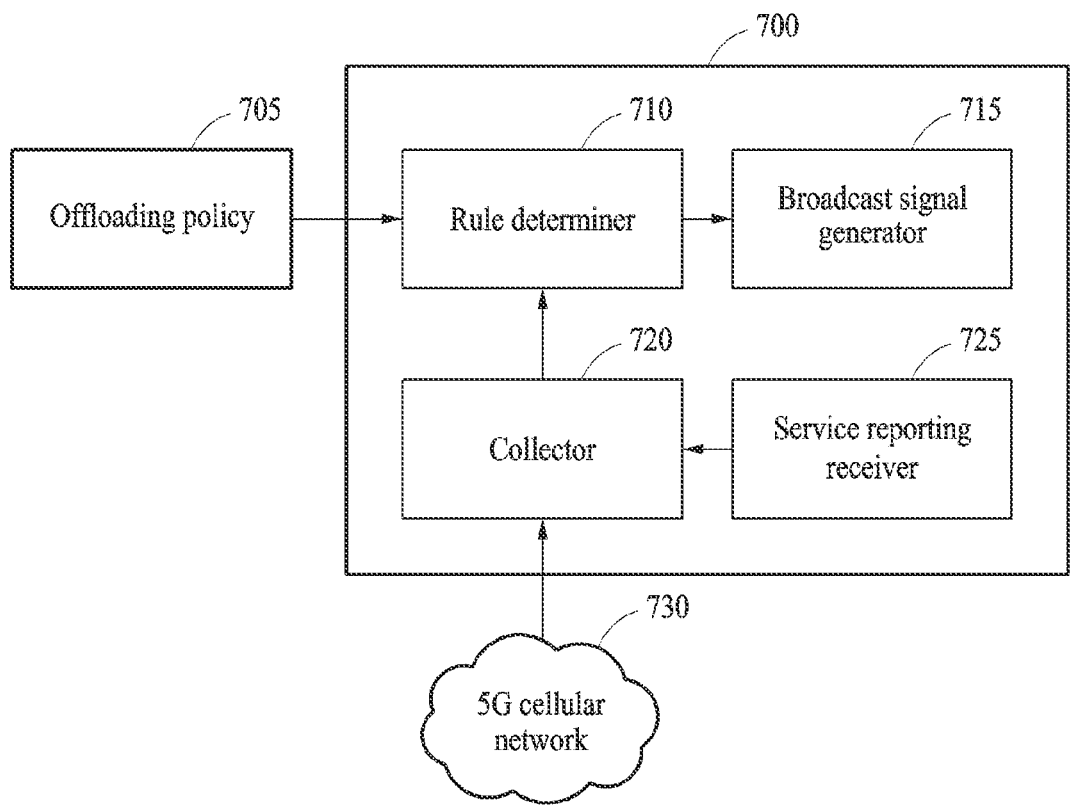
FIG. 7 is a diagram illustrating a control module in a media server according to an example embodiment.

FIG. 7 is a diagram illustrating a control module in a media server according to an example embodiment.

Referring to FIG. 7, a control module 700 in the media server may include a rule determiner 710, a broadcast signal generator 715, a collector 720, and a service reporting receiver 725.

In an example embodiment, an offloading policy 705 regarding offloading to a broadcast network may be predetermined so as to provide a stable service in a 5G cellular network 730 and reduce a service cost. The offloading policy 705 may include connection information of the broadcast network to be used for an offloading service. For example, the offloading policy 705 may include information on a broadcast channel to which media content data is to be mapped and offloaded among broadcast channels of the broadcast network, and information on a physical layer pipe (PLP) to which media content data is to be mapped among PLPs of an ATSC 3.0 network.

The offloading policy 705 may further include an offloading rule that is a criterion for determining whether to provide the offloading service, and an offloading condition including items that may be considered in the offloading rule. In an example embodiment, the offloading condition may include at least one of whether the broadcast network is available in a media content data reception area, a service quality of the cellular network 730, and the number of user terminals including a receiver capable of receiving the broadcast network. The service quality of of the cellular network 730 may include at least one of media server performance, network performance, and reception performance of the user terminals.

The offloading rule, which is determined in relation to the offloading condition, may be a determination criterion for determining a case in which offloading is performed. For example, the offloading rule may include an item to be considered and an item not to be considered in determining whether to provide the offloading service from among the items included in the offloading condition, and a ratio considered between the items to be considered. The offloading policy 705 may be inputted into the rule determiner 710.

The collector 720 may collect information on a media server, a cellular network, and a user terminal so as to collect information on the offloading condition. The service reporting receiver 725 may report usage environment information of the user terminal to the collector 720, and the collector 720 may collect information on the user terminal from the service reporting receiver 725. The collector 720 may determine, based on the collected information, whether the broadcast network is available in the media content data reception area, and the number of user terminals including the receiver capable of receiving the broadcast network.

The collector 720 may determine, based on the collected information, parameters indicating the media server performance and the performance of the 5G cellular network 730 that may affect a process of providing a streaming service through the 5G cellular network 730, as a matter corresponding to the offloading condition, and may collect a packet delay variation (or jitter) that determines a quality for media streaming in the user terminals from the service reporting receiver 725 that receives the usage environment information of the user terminals. Parameters related to the media server performance may be determined based on a CPU load factor, a memory load factor, and a terminal connection session failure rate. Parameters related to the performance of the cellular network 730 may be determined based on a load factor of a RAN and a load factor of a core network.

The rule determiner 710 may quantitatively determine a service quality of the cellular network 730 by setting, based on parameter values determined by the collector 720, threshold values and comparing the threshold values to the parameter values.

The rule determiner 710 may determine, based on the inputted offloading condition and rule, whether the offloading rule is satisfied, and determine whether to provide the offloading service.

When the rule determiner 710 determines to provide the offloading service, the broadcast signal generator 715 may generate an offloading service providing signal and a broadcast signal. The broadcast signal generator 715 may generate the offloading service providing signal and the broadcast signal, and then instruct a media stream packaging module of the media server so that the media server broadcasts the media content data through the broadcast network.

Figure 8:
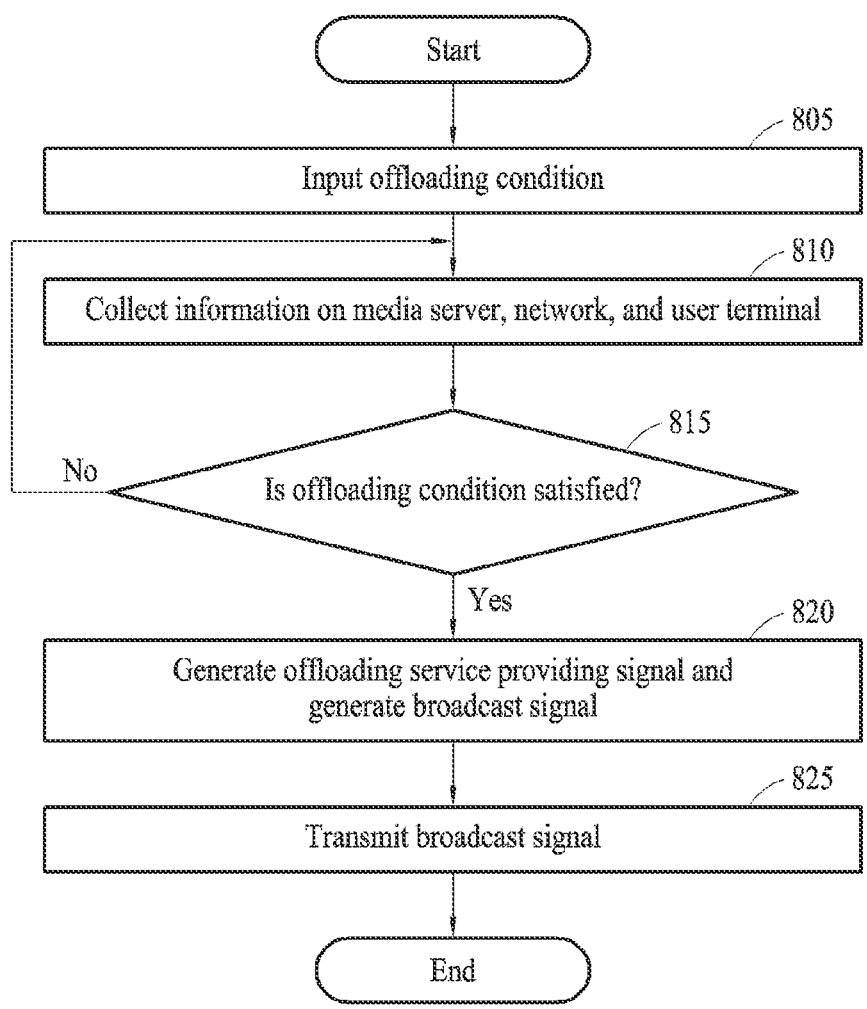
FIG. 8 is a flowchart illustrating an operation of a control method performed by a control module according to an example embodiment.

FIG. 8 is a flowchart illustrating an operation of a control method performed by a control module according to an example embodiment.

In operation 805, a predetermined offloading policy may be inputted to a control module. In an example embodiment, the offloading policy may include an offloading rule and an offloading condition. The offloading policy has been described above with reference to FIG. 7, and thus a repeated description will be omitted.

In operation 810, the control module may collect information on a media server, a network, and a user terminal so as to collect information on the offloading condition. The control module may determine, based on the collected information, whether a broadcast network is available in a media content data reception area, and the number of user terminals including a receiver capable of receiving a broadcast network.

The control module may determine, based on the collected information, parameters for performance of the media server, performance of a cellular network, and reception performance of the user terminal. The control module may quantitatively determine a service quality of the cellular network by setting threshold values for parameters and comparing the threshold values to parameter values.

In operation 815, the control module may determine whether the offloading rule is satisfied. For example, the control module may determine whether the determined service quality corresponding to the offloading rule, whether to the broadcast network is available in a media content data reception area, and the number of user terminals including a receiver capable of receiving the broadcast network satisfy the inputted offloading rule.

When the offloading rule is not satisfied in operation 815, the control module may continuously collect the parameters for the performance of the media server, the performance of the cellular network, and the reception performance of the user terminal, and verify whether the offloading rule is satisfied.

When the offloading rule is satisfied, in operation 820, the control module may generate an offloading service providing signal, and transmit the offloading service providing signal to the user terminal through the cellular network. The control module may generate a broadcast signal. In operation 825, the control module may initiate transmission of media content data through the broadcast network.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

What is claimed is:

1. A method of providing an offloading service for offloading media content data streamed through a cellular network to a broadcast network, the method comprising:
   streaming, to a user terminal including a cellular network receiver and a broadcast network receiver, the media content data through the cellular network;
   transmitting, to the user terminal, an offloading service providing signal for activating the broadcast network receiver of the user terminal through the cellular network;
   transmitting, to the user terminal, a broadcast signal including connection information of the broadcast network to which the user terminal is to be connected so as to receive the media content data, through the cellular network;
   broadcasting the media content data through the broadcast network; and
   determining whether to provide the offloading service,
   wherein the determining of whether to provide the offloading service comprises:
      an offloading policy which includes connection information of the broadcast network to be used for the offloading service, an offloading rule, and an offloading condition, and
      the offloading condition includes at least one of items including whether the broadcast network is available in a reception area in which the media content data is received, a service quality of the cellular network, and the number of user terminals comprising a receiver capable of receiving the broadcast network.

2. The method of claim 1, further comprising:
   determining whether to provide the offloading service,
   wherein the transmitting of the offloading service providing signal is performed when it is determined to provide the offloading service.

3. The method of claim 2, wherein the determining of whether to provide the offloading service comprises:

determining a service quality of the cellular network in an area in which the user terminal is located;

determining the number of user terminals including the broadcast network receiver; and determining to provide the offloading service when the service quality and the number of user terminals satisfy a predetermined offloading rule.

4. The method of claim 3, wherein the cellular network is a 5G network, and the broadcast network is an advanced television systems committee (ATSC) 3.0 network.

5. The method of claim 4, wherein the determining of whether to provide the offloading service further comprises determining whether the ATSC 3.0 network is available in the area, and the determining to provide the offloading service comprises determining to provide the offloading service when the service quality, the number of user terminals, and whether the ATSC 3.0 network is available satisfy the offloading rule.

6. The method of claim 3, wherein the determining of the service quality comprises determining, based on a load factor of the cellular network, reception performance of the user terminal, and a load factor of a server that provides the media content data, the service quality.

7. A media server apparatus for providing an offloading service for offloading media content data streamed through a cellular network to a broadcast network, the media server apparatus comprising:

a media streaming module configured to stream, to a user terminal comprising a cellular network receiver and a broadcast network receiver, the media content data through the cellular network;

a media stream packaging module configured to broadcast the media content data through the broadcast network; and a control module configured to provide, to the user terminal, an offloading service providing signal for activating the broadcast network receiver of the user terminal through the cellular network, transmit, to the user terminal, a broadcast signal including connection information of the broadcast network to which the user terminal is to be connected so as to receive the media content data, through the cellular network, and instruct the media stream packaging module so as to broadcast the media content data through the broadcast network, wherein the control module comprises:

a rule determiner configured to determine whether to provide the offloading service; and a broadcast signal generator configured to transmit, to the user terminal, the offloading service providing signal and the broadcast signal, and instruct the media stream packaging module so as to broadcast the media content data through the broadcast network.

8. The media server apparatus of claim 7, wherein the control module further comprises:

a collector configured to collect information on a media server, the cellular network, and the user terminal; and a service reporting receiver configured to report, to the collector, usage environment information of the user terminal.

9. The media server apparatus of claim 8, wherein the broadcast signal generator is configured to transmit the offloading service providing signal and the broadcast signal when the rule determiner determines to provide the offloading service.

10. The media server apparatus of claim 8, wherein the control module is configured to receive a predetermined offloading policy, and determine, based on whether an offloading rule included in the offloading policy is satisfied, whether to provide the offloading service.

11. The media server apparatus of claim 10, wherein the offloading policy includes connection information of a broadcast network to be used for an offloading service, the offloading rule, and an offloading condition, and the offloading condition includes at least one of items including whether the broadcast network is available in a reception area in which the media content data is received, a service quality of the cellular network, and the number of user terminals comprising a receiver capable of receiving the broadcast network.

12. The media server apparatus of claim 11, wherein the offloading rule includes items to be considered and items not to be considered in determining whether to provide the offloading service from among the items included in the offloading condition, and a ratio considered between the items to be considered.

13. The media server apparatus of claim 7, wherein the cellular network is a 5G network, and the broadcast network is an advanced television systems committee (ATSC) 3.0 network.

14. A user terminal that receives an offloading service for offloading media content data streamed through a cellular network to a broadcast network, the user terminal comprising:

a cellular network receiver configured to receive the media content data in a unicast or multicast manner through the cellular network;

a broadcast network receiver configured to receive the media content data broadcasted through the broadcast network; and at least one processor, wherein the at least one processor is configured to perform:

an operation of receiving the media content data using the cellular network receiver;

an operation of receiving an offloading service providing signal using the cellular network receiver; and an operation of activating the broadcast network receiver that is in an idle state in response to the received offloading service providing signal, wherein the offloading service is provided by a media server apparatus, wherein the media server apparatus determines whether to provide the offloading service, transmit, to the user terminal, the offloading service providing signal and the broadcast signal, and instruct the media stream packaging module so as to broadcast the media content data through the broadcast network.

15. The user terminal of claim 14, wherein the at least one processor is further configured to perform:

an operation of receiving a broadcast signal including connection information of the broadcast network to be connected so as to receive the media content data using the cellular network receiver; and an operation of receiving the media content data through the broadcast network receiver using the connection information included in the received broadcast signal.

16. The user terminal of claim 15, wherein the at least one processor is further configured to perform:

an operation of receiving an offloading service termination signal indicating that the offloading service is terminated using the broadcast network receiver; and an operation of switching the broadcast network receiver to the idle state.

\* \* \* \* \*